(12) United States Patent (10) Patent No.: US 7,873,237 B2
Grimaud et al. (45) Date of Patent: Jan. 18, 2011

(54) DEGRADING 3D INFORMATION

(75) Inventors: Jean-Jacques Grimaud, Winchester, MA (US); Eric Piccuezzu, Nice (FR); James Dugalais, Antibes (FR)

(73) Assignee: Dassault Systèmes, Suresnes (FR)

( * ) Notice: Subject to any disclaimer, the term of this patent is extended or adjusted under 35 U.S.C. 154(b) by 1303 days.

(21) Appl. No.: 11/356,325

(22) Filed: Feb. 17, 2006

(65) Prior Publication Data

US 2007/0196030 A1    Aug. 23, 2007

(51) Int. Cl.
G06K 9/36 (2006.01)
G06K 9/00 (2006.01)
G09C 3/00 (2006.01)
G09C 5/00 (2006.01)
H04N 7/167 (2006.01)

(52) U.S. Cl. .................. 382/276; 382/277; 382/100; 380/54; 380/201

(58) Field of Classification Search .................. None
See application file for complete search history.

(56) References Cited

U.S. PATENT DOCUMENTS

| | | |
|---|---|---|
| 4,754,267 A | 6/1988 | Reynolds et al. |
| 4,799,103 A | 1/1989 | Muckerheide |
| 4,868,766 A | 9/1989 | Oosterholt |
| 5,182,775 A | 1/1993 | Matsui et al. |
| 5,289,567 A | 2/1994 | Roth |
| 5,374,976 A | 12/1994 | Spannenburg |
| 5,377,314 A | 12/1994 | Bates et al. |
| 5,467,441 A | 11/1995 | Stone et al. |
| 5,617,114 A | 4/1997 | Bier et al. |
| 5,729,704 A | 3/1998 | Stone et al. |
| 5,808,616 A | 9/1998 | Shimizu |
| 5,815,150 A | 9/1998 | Shimizu |
| 5,815,154 A | 9/1998 | Hirschtick et al. |
| 5,818,455 A | 10/1998 | Stone et al. |
| 5,819,062 A | 10/1998 | Srikantappa |
| 5,861,885 A | 1/1999 | Strasnick et al. |
| 6,219,049 B1 | 4/2001 | Zuffante et al. |

(Continued)

FOREIGN PATENT DOCUMENTS

EP    0 636 971 B1    10/2001

OTHER PUBLICATIONS

Koller et al. ("Protected interactive 3D graphics via remote rendering", ACM transaction on graphics, vol. 23, Issue 3, Aug. 2004, pp. 695-703).*

*Primary Examiner*—Tom Y Lu
*Assistant Examiner*—Thomas A Conway
(74) *Attorney, Agent, or Firm*—Stites & Harbison PLLC; Jeffrey A. Haeberlin

(57) ABSTRACT

A method is provided for degrading 3D information such as a 3D image file from its original form so that that the subject matter of the 3D image is altered in a way which prevents one from reverse engineering or manufacturing the subject matter of the 3D image while the degraded image is still identifiable or recognizable as that of the original 3D image. The degrading method selectively alters dimensions or relationships between portions or parts of the 3D image from their original form while maintaining the integrity and recognizablility of the image as that of which was in the original 3D image. The present method can be applied to both original CAD files as well as reduced or lightweight files produced from an original CAD file.

12 Claims, 14 Drawing Sheets

Precision = 30 mm

U.S. PATENT DOCUMENTS

| | | |
|---|---|---|
| 6,346,940 B1 | 2/2002 | Fukunaga |
| 6,396,522 B1 | 5/2002 | Vu |
| 6,636,211 B2 | 10/2003 | Chartier et al. |
| 6,654,027 B1 | 11/2003 | Hernandez |
| 6,678,378 B1 * | 1/2004 | Akiyoshi .................. 380/54 |
| 6,714,201 B1 | 3/2004 | Grinstein et al. |
| 6,836,270 B2 | 12/2004 | Du |
| 6,859,201 B1 | 2/2005 | Singh |
| 6,885,367 B1 | 4/2005 | Fujieda |
| 2001/0055013 A1 | 12/2001 | Fuki |
| 2003/0174140 A1 | 9/2003 | Shima |
| 2006/0103669 A1 | 5/2006 | Piccuezzu et al. |

* cited by examiner

From Precision = 2 mm

Precision = 10 mm

Precision = 20 mm

Precision = 30 mm

Precision = 50 mm (Alteration is strong)

Brush tool is moved on the 3D model, user can see the 3D model through the brush

DEGRADING 3D INFORMATION

FIELD OF THE INVENTION

The present invention relates to a method for degrading an image, and in particular, a method for degrading a three dimensional image.

BACKGROUND OF THE INVENTION

Certain three dimensional (3D) information has to be publicly available to reach its target audience, e.g. individual consumers and businesses. For example, 3D information includes images such as schematics of machinery to be used by those who service the machinery which is the subject matter of the schematic. While the 3D information must be available to the public, at the same time, the 3D information needs to be protected to lessen the chances that the 3D information will be used for unintended purposes, including reverse engineering or manufacturing the subject matter of the 3D image.

The 3D information pertaining to a 3D image can be contained in a traditional computer aided design (CAD) file or a reduced, lightweight file format which contains the 3D image but not all of the additional code present in a full CAD file, referred to herein as a native CAD file.

Protecting 3D information is becoming more and more essential as competition moves labor overseas and outsourcing becomes more prevalent. This trend results in the movement of intellectual property into countries which may not support full protection of intellectual property rights or the countries may have local laws and courts which are slow to act to redress improprieties. Further, advances in computer network search engines allows one to locate 3D images on the Internet thereby making those 3D images readily accessible to anyone with a computer and a connection to the Internet.

Systems such as certificates and 3D watermarks are currently being used to add a minimum level of security or protection to the information contained in the 3D image. Unfortunately, these techniques do not prevent industrial reverse engineering, including unauthorized use of the image.

Effective methods of adequately protecting the subject matter of a 3D image/information, e.g. a part, is a complex problem. For example, protecting 3D models which are contained in a native CAD file currently involves restrictions in access to some of the data contained in the native CAD files, creating alternate files which include barriers to prevent reconstruction access to parts of the original 3D CAD models through imports, and creating alternate files with barriers to prevent reconstruction of the original 3D CAD model to other formats supported by a software application.

Original or native CAD files contain a wealth of information, much of which will never be made public. Critical information such as Product Manufacturing Information (PMI) and General Dimensioning & Tolerancing (GD&T) are often stripped from the original CAD file when generating a public version of the 3D information made available to the public.

CAD files are often translated into lightweight files which are typically more compact then the original CAD files. For example, curves and surfaces are replaced by different types of entities depending on the lightweight format, examples of lightweight formats include exact, hybrid and tessellated. Absent fundamentally altering the lightweight image, even if information pertaining to dimensions of the subject matter is truncated when displayed, the geometry and precision can be accessed in different ways. Further, truncation of dimensions or measurements rounded up or down is insufficient to prevent the unauthorized reverse engineering of the subject matter. For example, Acrobat3D® now uses the Okyz® technology to trap the list of graphic primitives as they are sent to the graphic card. This enables Acrobat3D® to read any Open GL-based model with a good accuracy. A similar approach can be successfully accomplished with DWF Writer®. An unauthorized individual wishing to reverse engineer the product can measure each part, one by one, by displaying the model at a very large scale with the zoom functions found in most software applications, when dimensions are made unavailable.

Further, conventional authorizing software applications, e.g. 3D Studio Max®, can open export CAD data in the form of a lightweight model, to enable the complete reading of the original lightweight model.

One recent method for protecting the intellectual property of a 3D image or shape, such as copyrighted data, is provided by U.S. Pat. No. 6,678,378 ('378). The '378 patent is directed to an encryption and de-encryption method for limiting unauthorized access to a 3D shape. The '378 method of encryption prevents unauthorized access to the image without entering a password or key to de-encrypt the encrypted file. Further, the encrypted file alters the original 3D shape data such that the encrypted 3D object can not be displayed in a meaningful way on a computer screen or the like. Thus, the encrypted file is useless to anyone who does not have access to the password or a method of de-encrypting the encrypted file.

There is a need in the art for new methods of protecting 3D images which allow one to distribute the images and/or make the available to the public for viewing in substantially the original 3D form, while protecting the intellectual property contained within the 3D image.

SUMMARY OF THE INVENTION

The present invention, in very general terms, concerns a method for degrading portions of a 3D image which allow the image to be displayed in substantially its original form but the degraded form prevents the unauthorized use of intellectual property contained within the 3D image. For example, a portion of the 3D image may be modified such that the exact dimensions are altered, thereby preventing one from being able to reverse engineer and manufacture a part or product which is the subject matter of the 3D image. However, the present method does not so alter the 3D image so that one still can view the 3D object, recognize its form, and use the information contained in the degraded image for the purposes of which the viewer is authorized.

The present method includes tools which enable one to protect private or proprietary 3D information by providing substituted 3D information which is degraded from the original 3D information to limit the intended uses of the 3D information for the consumers and the businesses and to prevent unauthorized persons from using the 3D information for unauthorized uses such as industrial reverse engineering of the subject matter of the 3D information.

The processes and methods described herein can be applied in areas such as disturbing scanned or numerical images for medical and/or patient privacy, for oil exploration measures and for GIS topographical data. The present degrading method can be implemented on servers to enable the degrading data requested from the external side of the firewall. This invention applies to surface and volumetric 3D images such as the ones used in the medical field, oil exploration and GIS data.

According to one aspect of the invention, there is provided a method for degrading 3D image data in which the method comprises selecting a native data file containing at least one 3D image comprising at least two parts. The two parts include one or more constraint parameters selected from the group consisting of the number of degrees of freedom and ranges. One or more of the constraints are modified and one or more levels of indirection in the metadata are created, to thereby form a degraded image file. The metadata can be separated if possible. It is not a required element, but an important one.

In one advantageous form, relationships are created between the parts to form parent-child relationships if the two parts were previously independent or previous parent-child relations are modified between the parts.

In accordance with another aspect of the invention, a method is provided for degrading the image of a 3D part which includes analyzing a native 3D part to determine elements of its geometry and dividing the 3D part into one or more pieces based on its geometry. A number of scalars are determined for use on each piece based on the geometry of the piece. The scalars can be applied to one or two or all three dimensions of the piece. A random value is selected for each scalar and the dimensions of the piece are scaled using the scalar value. The pieces are reassembled in the same arrangement as in the native 3D part to form a reconstituted part as a degraded part.

Preferably, the method further includes applying a disturbance function to vertices of the reconstituted part. In one form, the disturbance function comprises decreasing the number of bits which is used to quantatize the vertices of the reconstituted part or the disturbance function includes randomizing the vertices of the reconstituted part.

Preferably, the disturbance function is reversible via a complementary function.

According to yet another aspect of the invention, there is provided a method for degrading a 3D part which includes analyzing a 3D part to determine elements of its geometry and dividing the 3D part into one or more pieces based on the geometry of the part. A number of scalars are used on the geometry of the pieces and the scalars are applied to one or all three dimensions of the piece. A value for each scalar is randomly selected and the dimensions of the piece are scaled using the scalar value. The pieces are reassembled in the same arrangement as the native 3D part to form a reconstituted part. A disturbance function is applied to the vertices of the reconstituted part to thereby form a degraded part.

In accordance with yet another aspect of the present invention, a computer readable medium, having computer executable instruction stored therein for execution by a computer processor, the computer executable instruction for degrading 3D image data for an image comprising at least two parts, the instructions comprises the steps of:
  modifying one or more parameter constraints of at least one of the parts of a 3D image, the parameter constraints selected from the group consisting of the number of degrees of freedom and ranges; and
  creating one or more levels of indirection in the metadata to thereby form a degraded image file.

Preferably, the computer executable instruction further comprises:
  (i) modifying a parent-child relationship between the at least two parts, if the at least two parts have a parent-child relationship with one another; or
  (ii) creating one more relationships between the parts to form a parent-child relationship, if the two parts previously were independent.

In accordance with yet another aspect of the present invention, a system is provided for degrading a 3D image, the method comprising:
  memory; and
  a processor, said processor for executing:
    modify one or more parameter constraints of at least one of the parts of a three dimensional image, the parameter constraints selected from the group consisting of the number of degrees of freedom and ranges; and
    creating one or more levels of indirection in the metadata, to thereby form a degraded image file.

According to another aspect of the present invention, a computer readable medium having computer executable instructions stored therein for execution by a computer processor, the computer executable instructions for degrading three dimension image data, said instructions comprising the steps of:
  analyzing a native three dimensional part to determine elements of its geometry;
  dividing the three dimensional part into one or more pieces based on the geometry of the part;
  determining the number of scalars to be used for each piece based on the geometry of the piece, the scalars to be applied to one, two or all three dimensions of the piece;
  randomly selecting a value for each scalar;
  scaling the dimensions of the piece using the scalar value; and
  reassembling the pieces in the same arrangement as in the original three dimensional part, to form a reconstituted part to thereby form a degraded part.

According to yet another aspect of the present invention, a system for degrading a 3D image comprises:
  memory; and
  a processor, said processor for executing:
    analyzing a native three dimensional part to determine elements of its geometry;
    dividing the three dimensional part into one or more pieces based on the geometry of the part;
    determining the number of scalars to be used for each piece based on the geometry of the piece, the scalars to be applied to one, two or all three dimensions of the piece;
    randomly selecting a value for each scalar;
    scaling the dimensions of the piece using the scalar value; and
    reassembling the pieces in the same arrangement as in the original three dimensional part, to form a reconstituted part to thereby form a degraded part.

According to another aspect of the present invention, a method is provided for selectively degrading a 3D image, the method comprises selecting a portion of a 3D image to degrade and degrading that selected portion of the image.

Preferably, the degrading acts as a function of the amount of time a degrading function is applied to the portion.

Preferably, the degrading alters the image of the selected portion more at a center of the selected portion. For example, the vertices of the image at the center of the selected portion may be affected more than vertices at the perimeter of the selected portion.

According to yet another aspect of the invention, a computer readable medium having computer executable instructions stored thereon for execution by a computer processor includes computer executable instruction for selectively degrading a 3D image for which instruction comprises selecting a portion of a 3D image to degrade and degrading that portion of the image.

According to another aspect of the present invention, a system is provided for selectively degrading a 3D image for which the method comprises:
  memory; and
  a processor, said processor for executing:

selecting a portion of a three dimensional image to degrade; and degrading that selected portion of the image.

BRIEF DESCRIPTION OF THE DRAWINGS

Further characteristics and advantages of the invention will be revealed more fully in the following detailed description, provided by way of example and without restrictive intent, with reference to the attached drawings, in which.

DETAILED DESCRIPTION

The present invention, in a very general sense, concerns a novel method of degrading information in 3D information such as a 3D information, and in particular, degrading 3D information in a 3D image file pertaining to an assembly and its parts which comprise the subject matter of the 3D information. As noted, since the contents of CAD files are almost never made available to third parties, due to the size of CAD files and their value, a lightweight model is created to repurpose the contents of the CAD file. This present degradation method selectively degrades portions of the original 3D contents at different points in the process of creating a 3D image file, while producing a degraded image which is viewable by third-parties or and available for public use.

The degradation can be accomplished by creating a degradation of the 3D image or model before or during the transformation of some of the contents of the CAD file into a lightweight model. Alternatively, degradation can be accomplished by creating a degradation of the 3D model after an original lightweight model of the original CAD 3D model has been created without any degradation, except for the tessellations of the geometry and any data which was not transferred into the lightweight format.

The present degradation method can be reversible or irreversible based on the process selected and the desired reversibility of the degradation. For example, the degradation process applied to the geometry may be made reversible. Once the user has been identified, for example with a certificate, the user can launch a reverse degradation function to gain access to the complete original 3D information. This process may involve, for example, a uniquely defined random function.

In one form of the reverse degradation function, a complement of the degraded model is stored in a separate file and is made accessible through a computer network once a security process has been correctly executed by the authorized user.

Figure 1:
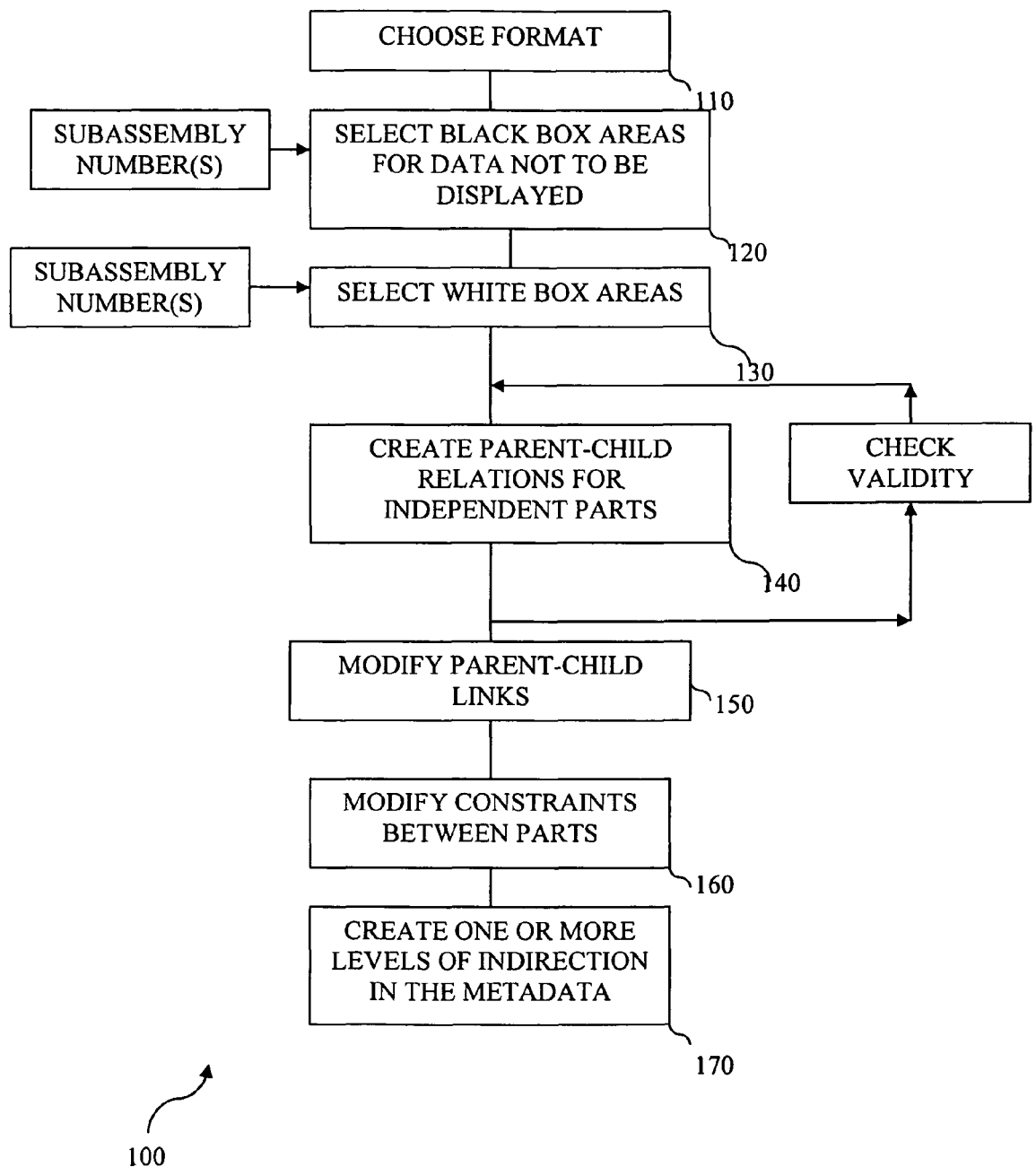
FIG. 1 is a flow chart showing a method of degrading a 3D image file at an assembly level in accordance with the present invention.
Figure 2:
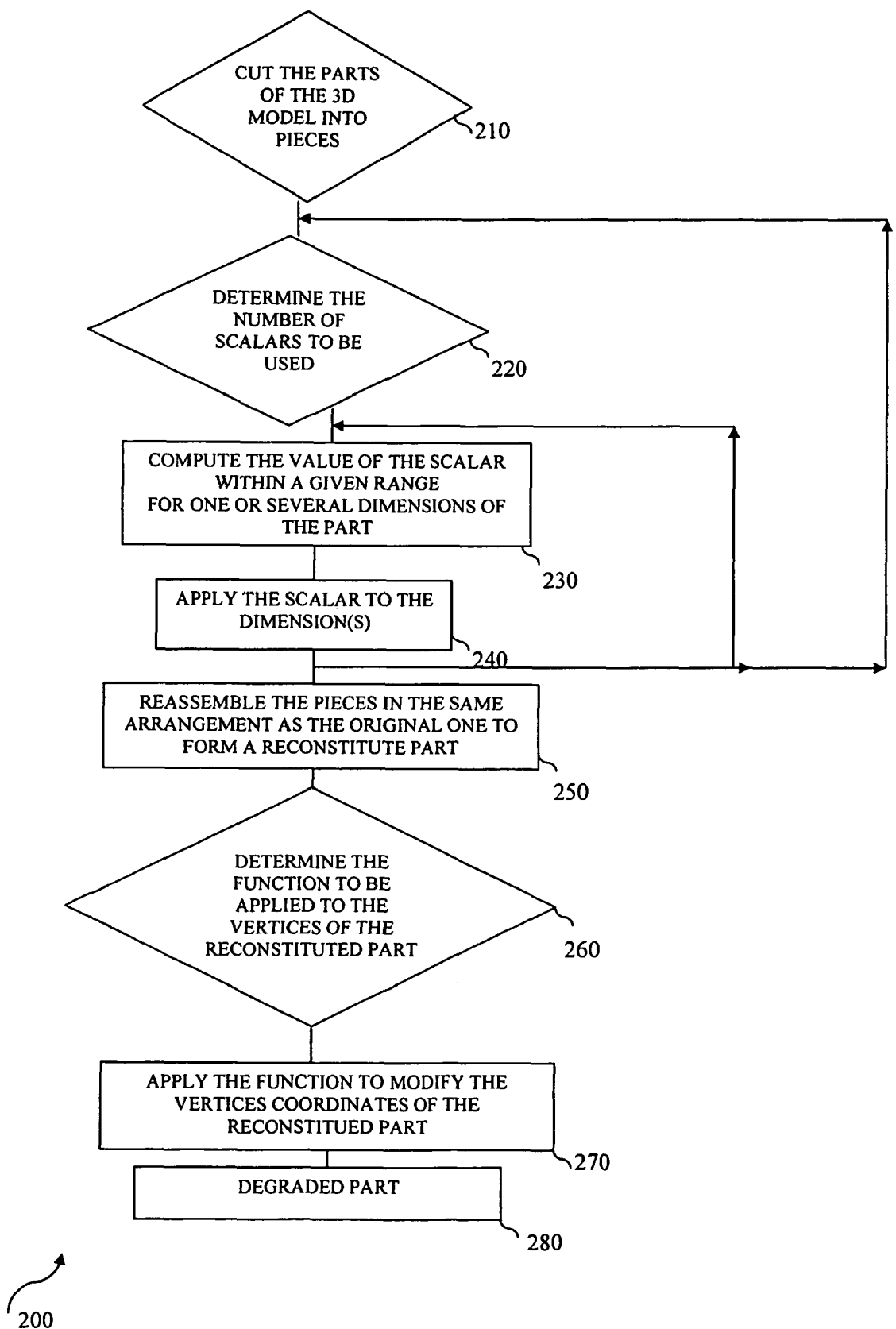
FIG. 2 is a flow chart of a method of degrading a 3D image at a part level, in accordance with another aspect of the present invention.

Referring generally to FIGS. 1 and 2, the present degradation method can be implemented to transform a lightweight model. The degradation process takes place after the CAD model has been transformed into a lightweight model. The process can take place either at the assembly level (FIG. 1) or at the part level (FIG. 2).

Turning now specifically to FIG. 1, degradation method 100 of a lightweight 3D model at the assembly level comprises choosing a format of the lightweight model at step 110. The format of the 3D lightweight model hybrid product description does not permit one to reverse engineering parts at the exact geometry level. Further, it is impossible to get some of the CAD construction tree or features from the hybrid product description. Defining the level of tessellation is also an important factor. Some example formats include hybrid formats such as JT files, smg files which can mix exact data and tessellated data or exact formats such as ACIS® and Paraasolid®.

At step 120, areas of the 3D image file not to be viewable in the degraded file are selected as "black boxes". Accordingly, data or images within the black boxes will not be present in the degraded file. For example a "black box" can be created for a subassembly which is present in the original 3D image. The resulting degraded file will modify the appearance of the subassembly by replacing its outer layer, so that details of the subassembly are hidden.

At step 130, portions of the 3D image which are to be preserved in the final degraded model are selected as "white boxes". Accordingly, data in the white boxes will remain accessible after the completion of the degradation process. For example, "white box" information may comprise the overall dimensions of an engine of a motorbike to enable an authorized viewer, e.g. a Tier 1 supplier, to do his or her job. However, the internal subassemblies of the engine will be degraded.

At step 140, relationships are created between parts, if previously, there were none. These relationships include parent-child relationships.

At step 150, the relationship between parents and children of objects which comprise the 3D model are changed. For example, the changed relationship may include inverting parent and child, or selecting a new allowable parent as necessary or desired. This is described further below with regard to the degradation of a part which comprises a 3D image in method 200.

At step 160, if parts which comprise the 3D model include constrains, one or more of the these constraints between the parts, are modified. Such constraints include degrees of freedom or ranges. For example, ranges of constraints may be modified to let the user find easily the part which he will need to open to get inside the product and recognize the parts that he needs. Many objects are made to appear seamless, and modifying the range or nature of the constraints facilitates the task of the consumer without resorting to anumation or a sequence or images At step 170, indirections are created in the metadata. For example, the CAD data may comprise metadata such as information of a manufacturer part identifying system. This information may be replaced by a proprietary identifying system in order to ensure that parts cannot be identified from the degraded 3D image file and bought elsewhere such as from an unauthorized manufacturer or distributor. Part identifiers for large custom systems can be set up in unpredictable ways, to make servicing by unauthorized individuals, such as third parties almost impossible.

The present method 100 offers the possibility of merging the geometries of a group of individual parts. This is more than a grouping. The geometry now represents the union of the parts and the original parts contained in this union grouping will be lost. This can be used, for example, to represent a set of parts which are not available for sale. A lawn mower may have only certain parts available for sale, and if one of the other parts (typically large, essential parts) are broken, a new lawn mower will be need to be bought or an exchange program is available. The consumer benefits by having all the parts which he cannot buy in a single object, and the object cannot be duplicated, because it contains several parts likely composed of different materials.

Turning now to FIG. 2, method 200 is a process for degrading a lightweight 3D model at the part level. Method 200 can be used to generate a degraded 3D lightweight model which allows consumers to access the data of the lightweight model so as to be able to service the subject matter of the 3D model and for other uses such as to order parts from viewing exploded views of the degraded file. No additional piece of software is necessary to view the degraded 3D image file. The process enables the user to access the information at the intended level. Such level is determined by the owner of the intellectual property linked to the 3D part. In an exploded view, each part is visible. With current techniques such as the one used by Acrobat3D®, the geometry of the part could be captured and used to duplicate the part. The process forbids an unauthorized use of the information but is not preventing the intended use of the three dimensional images.

Degradation method 200 includes analyzing one or more parts which comprise a lightweight data file (step 210). One or more of the parts may be cut into several pieces. The decision to cut a part into pieces is based on criteria involving general and local elements of the geometry of the part. For example, the criteria may include the relative orientation of surfaces, lathed shapes, number and position of holes, etc.

Next, each piece of the part is positioned in its local coordinates (step 210) to be scaled in each dimension according to scalars.

At step 220, a number of scalars are determined. The shape of the piece defines the number of scalar numbers used in method 200. One scalar can be selected which is applied to all three dimensions, X, Y, Z of the piece of the part; two scalars can be selected where one of which is applied to two dimensions; or three scalars can be selected, each applied to a single dimension. For example, a screw or a tube, which are cylindrical in shape, will have two scalar operations: the various lengths parallel to the principal axis of the cylinder (Z), and the scale of the base of the cylindrical shape (X and Y remain in proportion, and a circle is not transformed into an ellipse). Different processes for selecting scalar can be used. If the piece of the part does not contain holes, the 3 scalar are used. If the piece of the part contains one conical or cylindrical hole, then 2 scalars are used, one being orthogonal, to the principal axis of the other and the other scalar covering the two dimensions of the circles of the holes. When two holes or more share the three dimensions of the piece of the part, then only one scalar may be used. This process can be refined by using anisotropic changes in the XYZ coordinates of the space of the piece of the part.

At step 230, the value of each scalar is determined. This number is within a range straddling the unit (for example, 0.9 and 1.1), and has n digits (for example, 0.91538659 is a number with 9 digits). The number is created digit by digit at random. The first two digits are either 0.9 or 1.0. The next digits are each between 0 and 9. Respective dimensions of the part are scaled with the value of the respective scalar (step 240). The combination of the transformations using the scalar (s) moves coordinates of points from x0, y0, z0 to x1, y1, z1.

At step 250, the pieces are now reassembled in the same arrangement as they were in the original lightweight model file, i.e. of the original part, to form a reconstituted part. The reconstituted part has the general shape of the original part, but with multiple scalar operations performed on subsets of the part.

During scaling of the individual parts/pieces, the dimensions of the individual pieces are altered so that merely re-assembling the parts would lead to gaps or overlaps between the pieces. Therefore, in order to ensure continuity between the pieces, step 250 accommodates the introduced various is dimensions of the pieces.

For example, in a simple case, the part is divided, i.e. partitioned in pieces (step 210), using a simple plane (infinite), for example using the XY coordinates. Take a part along one of its principal axis and have a cutting plane orthogonal to that principal axis. As the cutting plane moves along the principal axis, it will generate two surfaces in each cross section, one for each sub-part. Their areas might be equal, as in the case of a block, or unequal as in the case of a shoulder on the part. When they are unequal, it shows a natural discontinuity of the part at this point.

The discontinuities can be ordered as a pair (distance along the principal axis, difference between surfaces) and this can be repeated for the two other principal axis. The resulting table for the three axis can then be ordered and a decision be made as to which discontinuities are going to be exploited for the cut and the creation of subpart and this can be used to select the points at which and the order in which the part will be cut along the 3 axis.

As the cutting plane moves through the part (step 210), it is also possible to store the rate of change of the surfaces (derivative) and keep track of the discontinuities and of the sign change. These derivatives and higher order derivatives may be used in the decision process for determining the position and the order of the cuts on the 3 axis.

Another decision element is the counting of holes in the x, y and z dimensions as the plane moves through the chosen principal axis. This information may be used in complex parts to isolate holes or group of holes which will likely use the same scalar value to avoid elliptical shapes. Then, at step 240, the scalar values are applied as a following step to the partitioning of the part.

At step 260, a disturbance function is selected to be applied to the vertices of the reconstituted part. The selected disturbance function will subsequently be applied to the vertices of the reconstituted part.

The disturbance function is selected based on how the function will effect the resulting 3D image. For example, the human eye is more sensitive to the way light is reflected (orientation in space of the normals to the surface of the model) than to the accuracy of the geometry of the model.

Accordingly, using the desired disturbance function, the normals to the surface of the 3D model are not affected by present degradation via disturbance generators, to maintain a good visual perception of the degraded model. Such disturbances, which do not change the convex curvatures of the 3D model can be added using a number of techniques.

One disturbance function includes a technique to lessen the number of bits which are used to quantize the vertices. This disturbance function degrades the image in a way which is irreversible. A second disturbance function comprises a user defining the level of accuracy (I). This accuracy can be either an absolute accuracy or a relative accuracy to the size of the model. If V represents the coordinate, then:

$$V_{degraded} = I \times (\text{integer part of } (V/I))$$

A third disturbance function includes randomizing the spatial position of the vertices in the 3D image file. This disturbance function may be made reversible with a key to the random generator.

At step 270, the disturbance function is applied to spatial position of the vertices of the reconstituted part. This moves the absolute coordinates of the points of the reconstituted part from X1, Y1, Z1 to X2, Y2, Z2 to form a degraded part at step 180.

The application of the selected disturbance function (step 270) significantly affects the dimensions of the reconstituted parts. However, the degraded part maintains its visually perceivable appearance. Thus, the application of the disturbance function (step 270) does not excessively distort the parts. The application maintains the geometrical relations which may be needed, for example, for vector images of exploded assemblies or animation.

It will now be apparent to one skilled in the art that method 200 incorporates the use of three separate steps to make it much more difficult to reverse engineer the degradation of the 3D model, namely correcting for randomization of vertices, finding each piece of the part and finding scalar values for the corresponding altered dimensions of each piece of the part. Further, the present degrading method makes readings of the degraded 3D model through imports such as Acrobat3D® or DWF Writer® or exports such as 3D Studio® ineffective for the purpose of industrial reproduction while enabling the use of downstream applications.

It will now be apparent to one of ordinary skill in the art that the present degrading method 200 hampers reverse engineering of parts which comprise the subject matter of a 3D image. For example, reverse engineering based on scaling per part is prevented by the calibration of an edge using the present scaling method in which the part is divided into pieces, i.e. partitioned, before a scaling is made.

As an alternative to the partitioning method described above, a part can be cut and scale iteratively following similar principles. In an alternative method, a degrade function guarantees the uniqueness of the degradation for each vertex, and for each dimension x, y, z in a referential shared by all the parts. For example, the X coordinate value 3.211 will be transformed in the x coordinate value 3.2 whatever the vertex associated to that coordinate. If two cubes share the same vertex, they will remain attached to one another after degradation.

Figure 3:
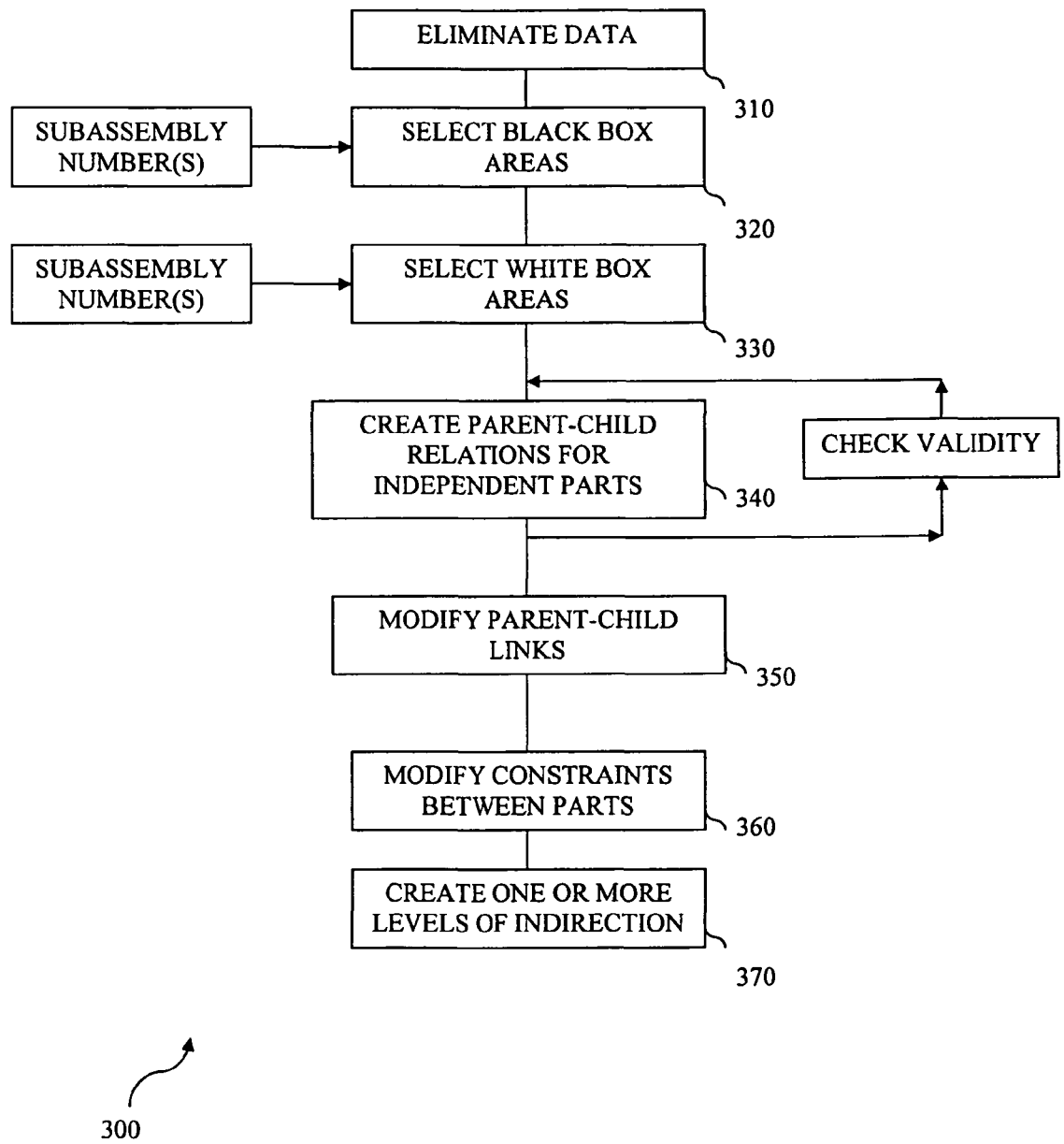
FIG. 3 is a flow chart of a method of degrading a 3D image at the assembly level in accordance with another aspect of the present invention.

Referring now to FIG. 3, in accordance with another aspect of the present invention, method 300 provides degradation of the 3D data at the CAD level and in particular the assembly level.

At step 310, datums from the CAD file are eliminated to make relationships within the CAD file more difficult to be understood. At step 320, "black boxes" are created to represent areas or data of the CAD information, which will not be viewable in the degraded model. For example, a subassembly of CAD model can be replaced by an outer layer representing the subassembly, so that details of the subassembly are hidden.

At step 330, "white boxes" are created which correspond to areas of the CAD model which will remain accessible after the completion of degradation method 300. For example, if the CAD model is of a motorbike, the degraded CAD file will include the frame of the bike with dimensions of the bike altered. However, the overall dimensions of the engine will not be degraded to enable an authorized viewer, e.g. desired Tier 1 supplier, to view the engine dimensions and thus be able to do his or her job. However, the internal subassemblies of the engine will be degraded.

At step 340, relationships between parts and subparts of the CAD model are created, as necessary, if there previously were none. At step 350, the relationship between parents and children objects of the CAD model are changed. For example, some changes include inversing parent and child, and selecting a new allowable parent.

At step 360, constratints between parts and subparts of the CAD model present are modified. These constraints include degrees of freedom and range.

It is often difficult to find how to take apart a product. Seams are often hidden, finding the hinge or the pivot which open the product is often quite difficult. Similarly, pressure must be exerted at the proper point(s) for getting inside the product. For example, the range of a hinge may be decreased, so that the hinge can no longer be completely closed and so that the user will have no problem in finding where to open his product. Similarly, it might be more advantageous to decrease the number of degrees of freedom, so that the user will be able to more easily open the three dimensional image in the proper direction, even if the user is somewhat awkward with the mouse.

At step 370, indirections are created in the metadata in a manner as described previously with regard to step 170 of method 100.

Figure 4:
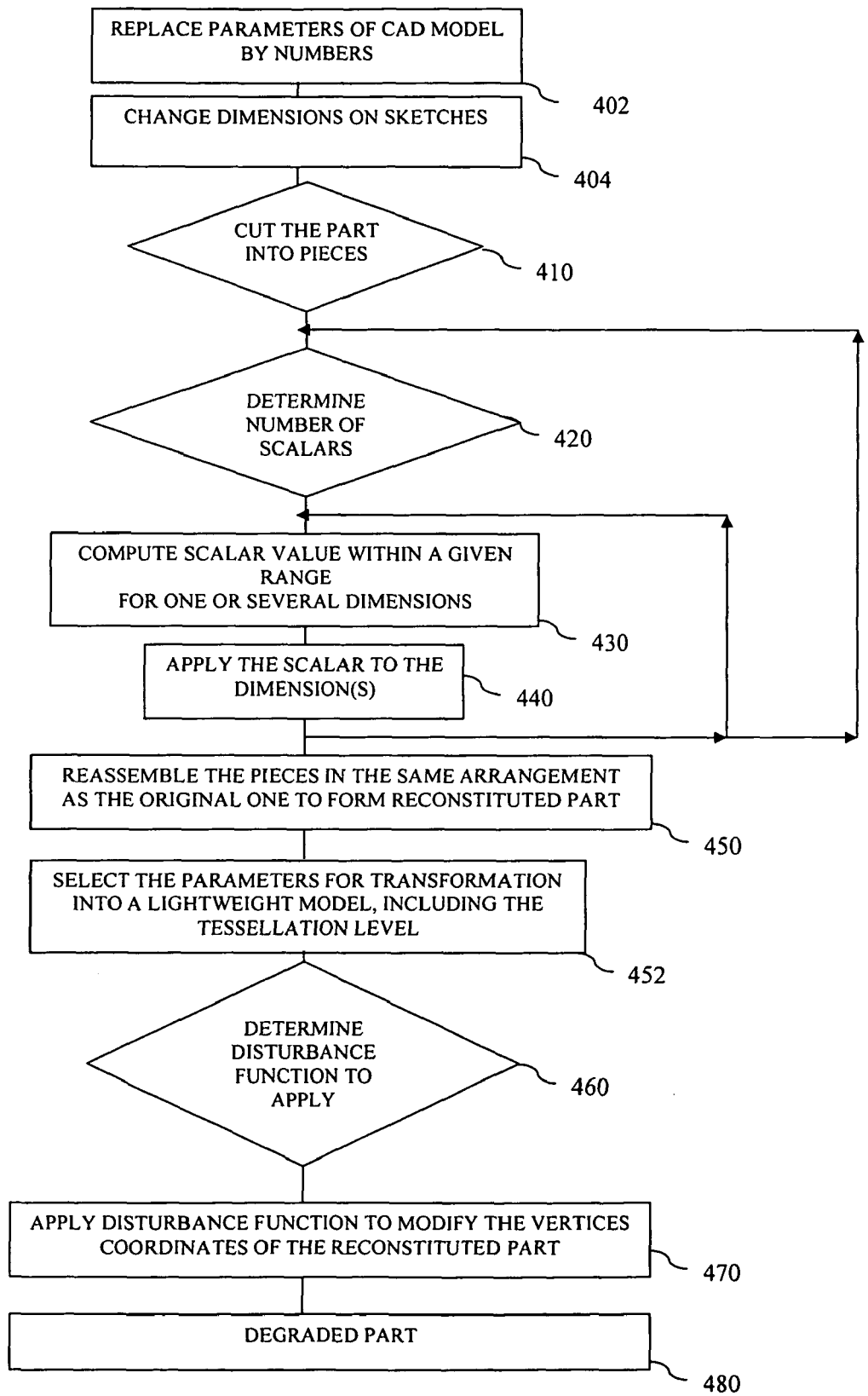
FIG. 4 is a flow chart of a method for degrading a 3D image at the CAD level of a part, in accordance with another aspect of the present invention.
Figure 5:
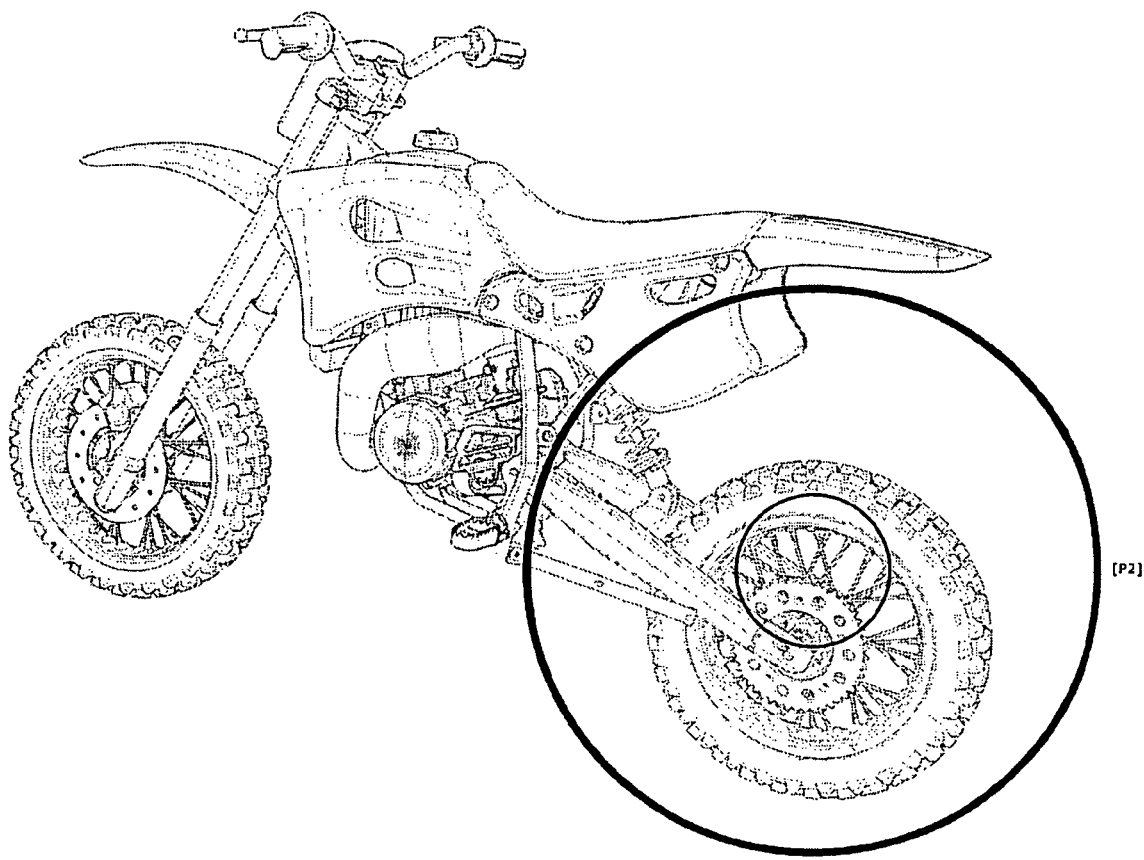
FIG. 5 is a screen-shot of an implementation of localized degradation of a 3D object in accordance with another aspect of the present invention.
Figure 6:
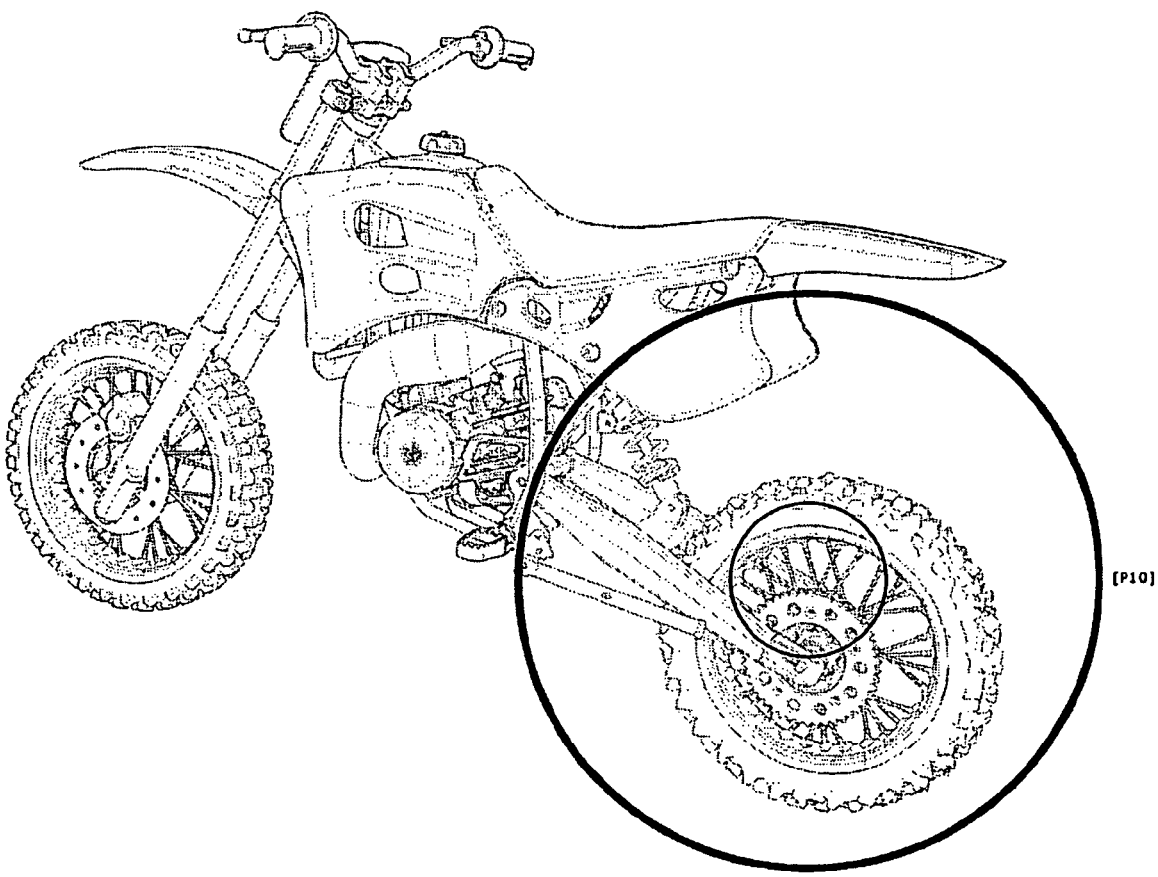
FIG. 6 is another screen shot of the implementation of the localized degradation of the 3D image of FIG. 5.
Figure 7:
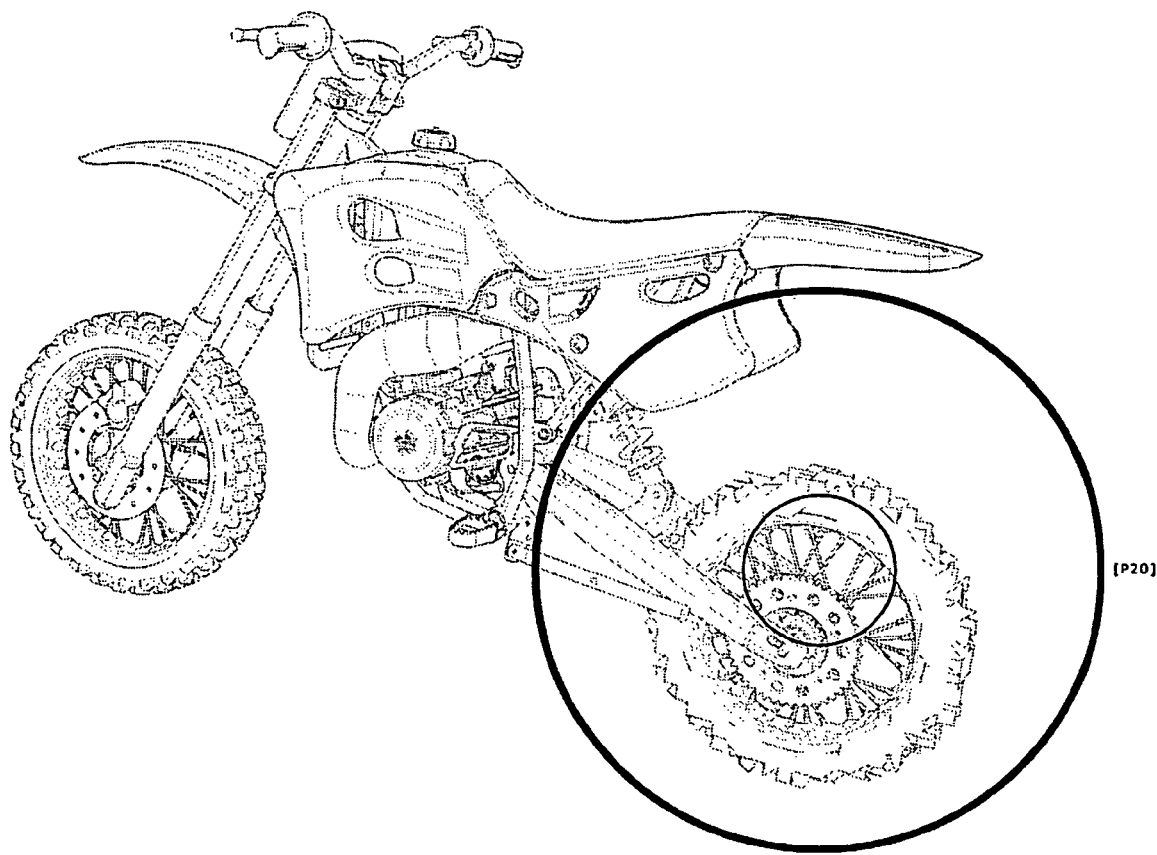
FIG. 7 is another screen shot of the localized degradation of the 3D image of FIG. 5.
Figure 8:
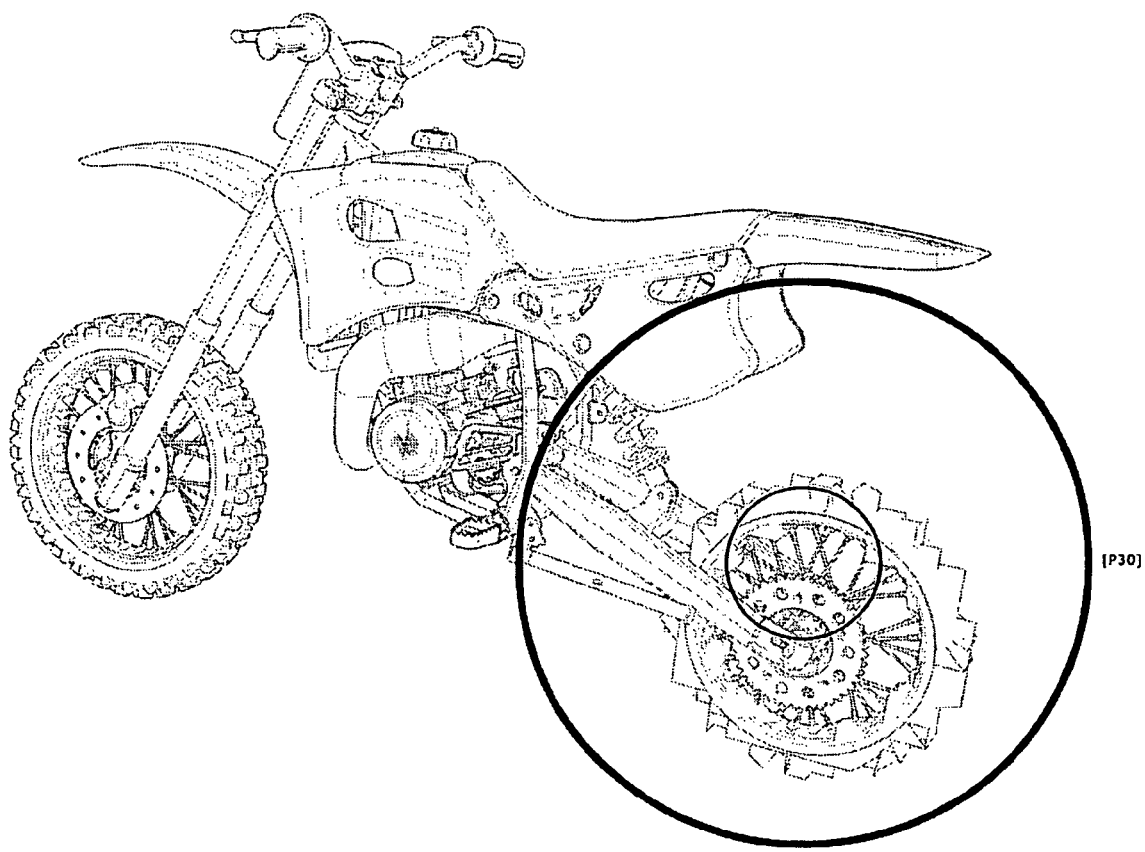
FIG. 8 is another screen shot of the localized degradation of the 3D image of FIG. 5.

Referring now to FIG. 4, which pertains to another embodiment of the present invention, method 400 is directed to the degradation of a 3D image at the CAD level of a part.

At step 402, parameters of parametric equations of the CAD model are replaced by numbers.

At step 404, dimensions on sketches which comprise the CAD model are altered/changed, advantageously within a 5% to 10% range.

If the design intent is well done, basic inferred or explicit constraints of a sketch will be supplemented by just enough dimensions so that the sketch avoids being under constrained or over-constrained.

At step 410, the 3D model, e.g. its parts or subparts are cut into pieces.

At step 420, the number and the range of scalars to be used to represent the model are determined in a similar manner as described above with regard to step 220 of method 200.

At step 430, the value of each scalar for the dimension(s) of the model are computed and at step 440, the value of the scalar is applied to dimensions of the part of the model. At step 450, the pieces of the part are reassembled. At step 452, a low number of tessellations is chosen, for example, 5.

At step 460, disturbance function is determined or selected to be applied to the vertices of the reconstituted part, as described above in step 260 of method 200. Next, at step 470, the determined disturbance function is applied to the vertices coordinates of the reconstituted part, to produce the degraded part at step 480.

Referring to all four methods, 100, 200, 300, 400, the degradation methods can be a reversible or not. For example, a reversible function may be a random generator function with defined initial variables in which random values in [0 1] are multiplied with a parameter, P, which is fixed by a user, and determines the level of degradation. The random values are added to the vertices coordinates to add "noise". The same random values may be generated by the user, and the process may be simply inverted by subtraction.

For example, a prior random generator function is one invented by D. H. Lehmer who also invented the multiplicative congruential algorithm, which is the basis for many of the random number generators in use today. Lehmer's generators involve three integer parameters, a, c, and m, and an initial value, x0, called the seed. A sequence of integers is defined by xk+1=axk+c mod m. The operation "mod m" means take the remainder after division by m. For example, with a=13, c=0, m=31, and x0=1, the sequence begins with 1; 13; 14; 27; 10; 6; 16; 22; 7; 29; 5 . . . . The first 30 terms in the sequence are a permutation of the integers from 1 to 30 and then the sequence repeats itself. It has a period equal to m−1.

The present reversible function generates different values for each X, Y, Z of vertices. This function is initialized at the beginning of the program with (X0, a, c, m) which constitute the defined initial variables of the function m is the range of the generated values. The precision of value V is computed like this: Random=a*PreviousRandom+c mod m PreviousRandom=Random $V_{Degraded}$=V+(Random*P/m). Where P is the desired precision parameter (degradation level). If X0, a, c and m are known, the degradation may be reversed.

Three dimensional changes, e.g. between original and modified coordinates may be stored in separated data files as lightweight delta files. In this case, the function does not need to be reversible. Many files may be generated depending on the degraded parts or assemblies. These lightweight delta files can not be used alone.

For each degraded vertex part, delta values are stored in a file:

V is the original vertex
Vdegraded is the degraded vertex
DeltaVx=Vdegraded.x−V.x
DeltaVy=Vdegraded.y−V.y
DeltaVz=Vdegraded.z−V.z If delta file is provide to the client, the client may restore original values like this:

V.x=Vdegraded.x−DeltaVx
V.y=Vdegraded.y−DeltaVy
V.z=Vdegraded.z−DeltaVz

The present method can be used in different configurations. In one preferred embodiment, the degraded file and the delta file are stored separately in two different repositories. The access to the delta files can be granted for each user for the set of parts for which he has the privileges.

If a 3D lightweight model is an exact 3D image from the full 3D CAD file, the present degradation methods, 100, 200, 300, 400 may suppress features from the construction tree for example and change the precision of the nodes points. A feature may be a "hole feature" for example. If the user decides to suppress "hole features", holes will not appear on the parts. The precision of the node points (Vertices) may be degraded as explained before.

The following is an example of the present degrading application in which a modified tree structure is created when generating a degraded image of a clamshell structure. This example is intended to provided enhanced understanding of the present invention but in no way to limit its scope or breadth in any way.

A 3D clamshell structure contains a mechanism and some of the parts are using the interior of the two shells to be properly positioned. The creator of the clamshell structure may want the end user to be able to open the two shells of the clamshell so that the user can see all the parts, but the user will not be able to access the original tree structure which comprise the original 3D image file. Accordingly, using the present method, the original 3D image file which includes a tree structure for organizing the parts which comprise the image, are altered to produce a degraded version of the 3D image file in which a modified tree structure is generated. Accordingly, in the degraded file, the user can view the parts, associated with the right or the left shell, to access and identification of the part(s) at a low level of detail or part in an exploded view, which the user can use for ordering the part, and the user may have a second, higher detail view of a part which the user can use for servicing the part.

In a larger clamshell mechanism, for example, it might be advantageous to show three or more groupings of parts to have the parts inside each grouping relate to each other. For example, consumers without a technical background may have difficulties understanding exploded views. The present use of a modified tree structure provides an alternative to conventional exploded views of 3D images of assembly/parts.

The present degrading methods can be implemented in any appropriate computer environment known to one of ordinary skill in the art which includes on a microprocessor computer, on a server, on a client computer or in a mixed network environment in which part of the method is conducted on a server and part is conducted on a client computer.

Referring now generally to FIGS. 5-14, in another embodiment of the present invention, a local degradation and reverse degradation function is applied to a 3D shape and/or data relating to that shape, representing a 3D object.

In general, this local degradation is a method for localizing the degradation of the accuracy of a 3D model. In this method a 3D brush, has a circular zone with a user-defined variable radius. In an advantageous form, the effect of the tool is limited within the circular zone.

The 3D brush is moved on and around the 3D model displayed on a computer in the same way as a conventional two dimensional (2D) brush operates which will be readily understood by one of ordinary skill in the art. As long as the user presses on one of the mouse buttons, a keyboard key, or a combination of them, the accuracy of the part of the 3D model contained in the zone will decrease. Thus, the 3D brush acts as a degrader of the local geometry of the 3D model. The effect can be modulated, so that vertices in the center of the brush may be more affected, and no effect happens on the immediate inside perimeter of the zone.

The effect of the tool may be cumulative: the longer the time the tool is used on an area, the lower the accuracy of the vertices. This can be limited to visible vertices, and/or to the parts selected, so that the context of these parts is not disturbed.

A user can define the proper settings as desired to address the specific objectives and constraints of his project. A balance has to be made between a too light application of the 3D brush which would leave many dimensions too close to the original ones, and a too heavy one, which would create problems downstream in the proper expression of animation or other MVP assets.

Figure 9:
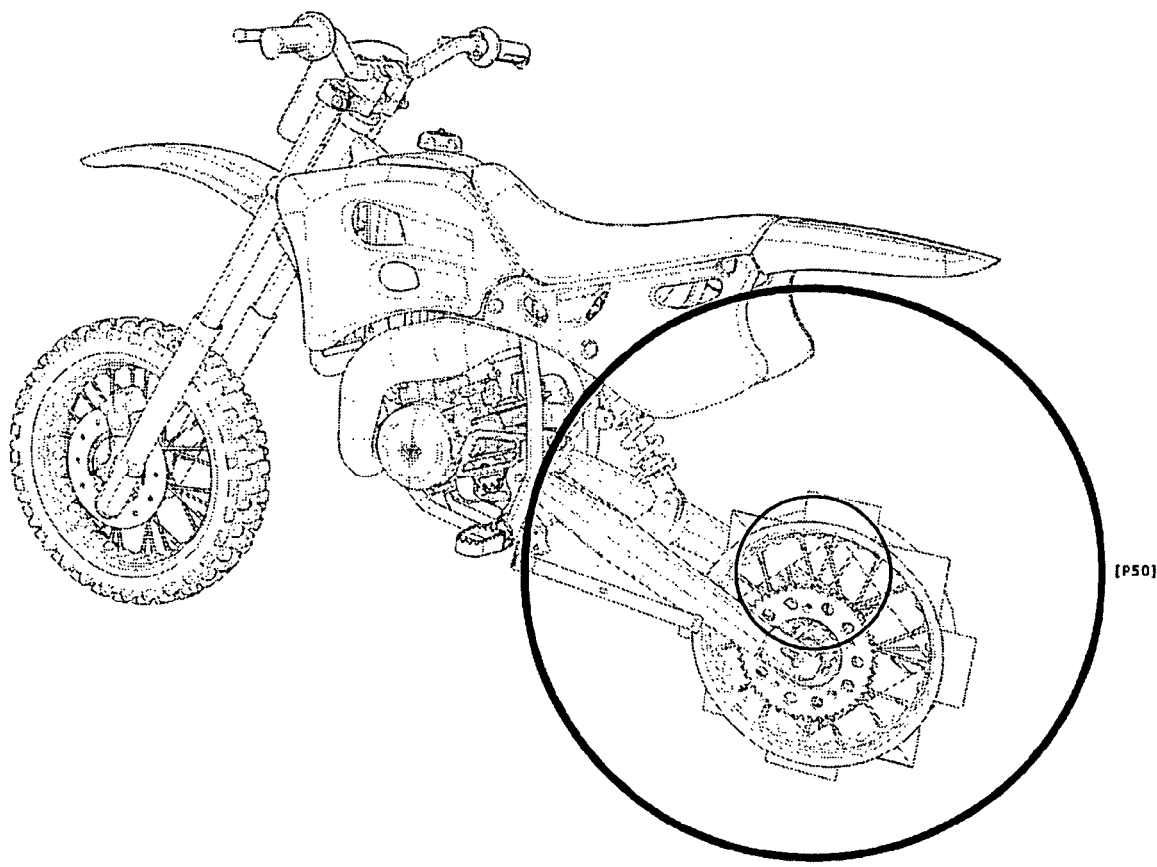
FIG. 9 is another screen shot of local degradation of the 3D image of FIG. 5.
Figure 10:
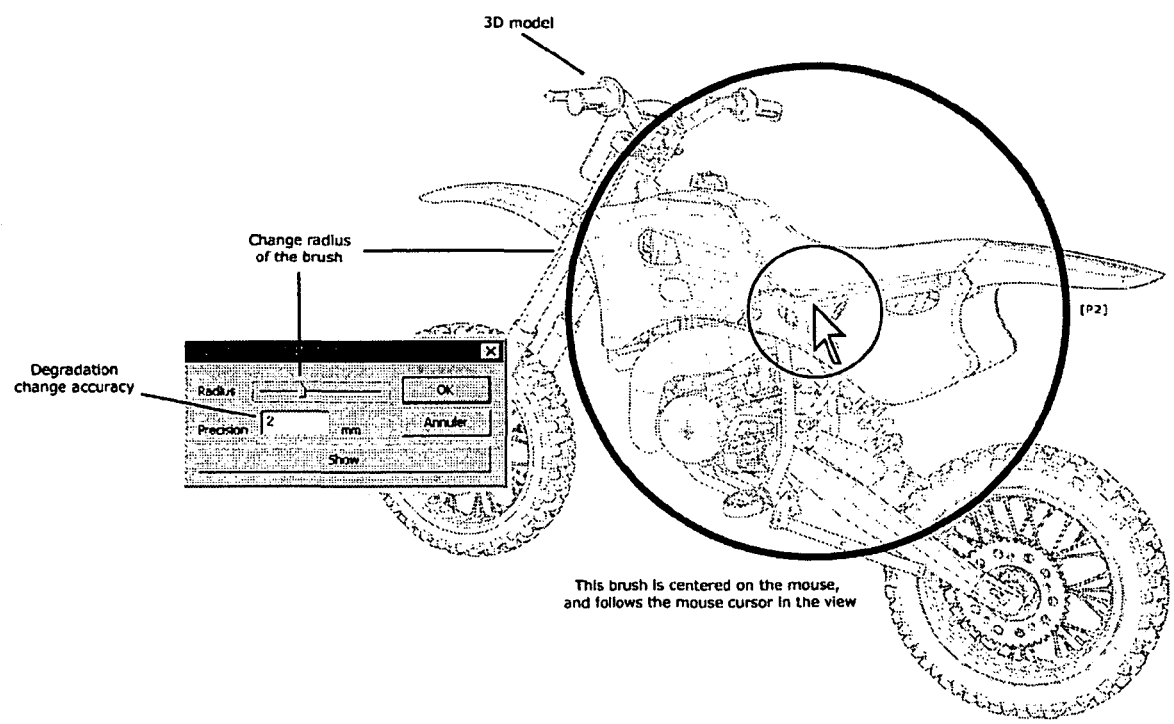
FIG. 10 is screen shot of localized degradation of another 3D image, in accordance with another aspect of the present invention.
Figure 11:
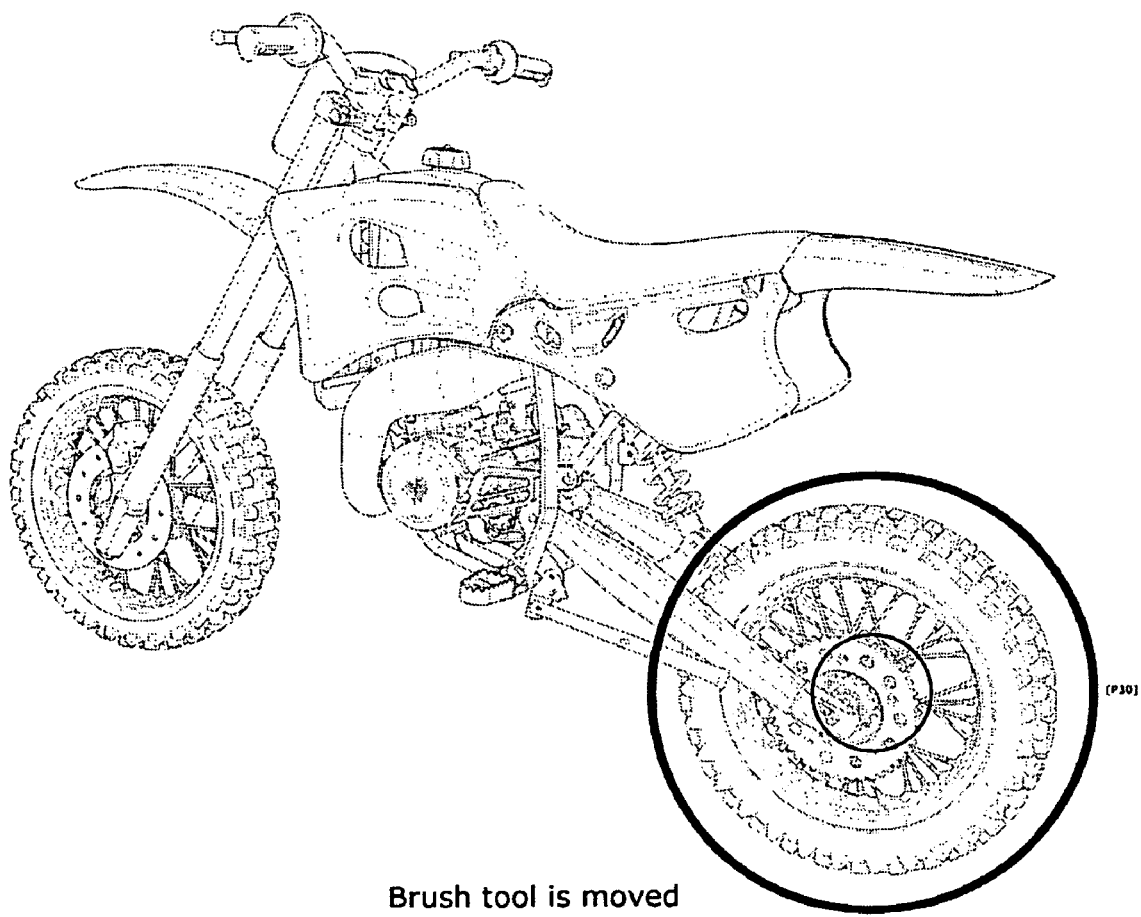
FIG. 11 is another screen shot of the implementation of local degradation of a 3D image.
Figure 12:
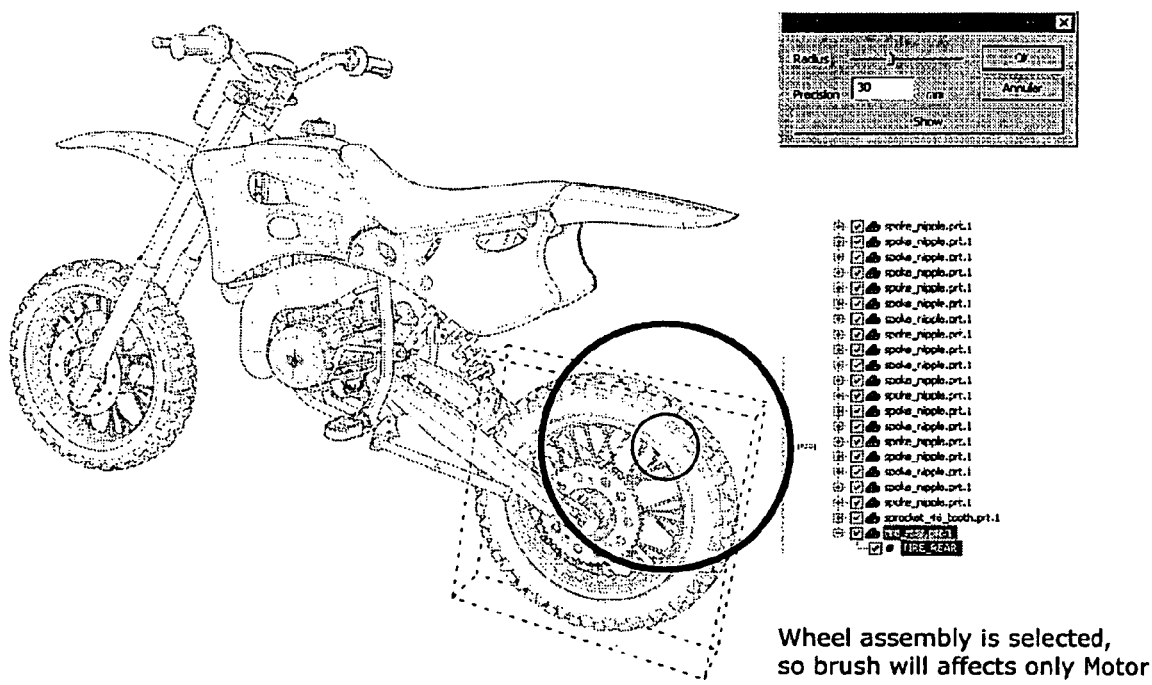
FIG. 12 is another screen shot of the implementation of local degradation of a 3D image.
Figure 13:
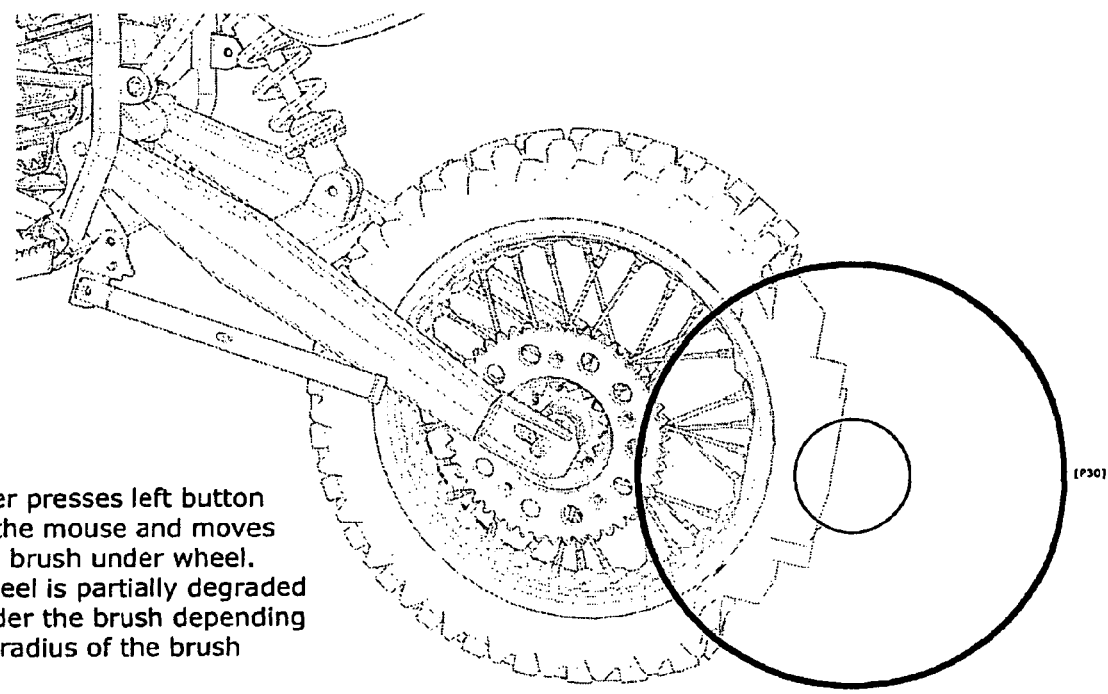
FIG. 13 is another screen shot of the implementation of local degradation of a 3D image.
Figure 14:
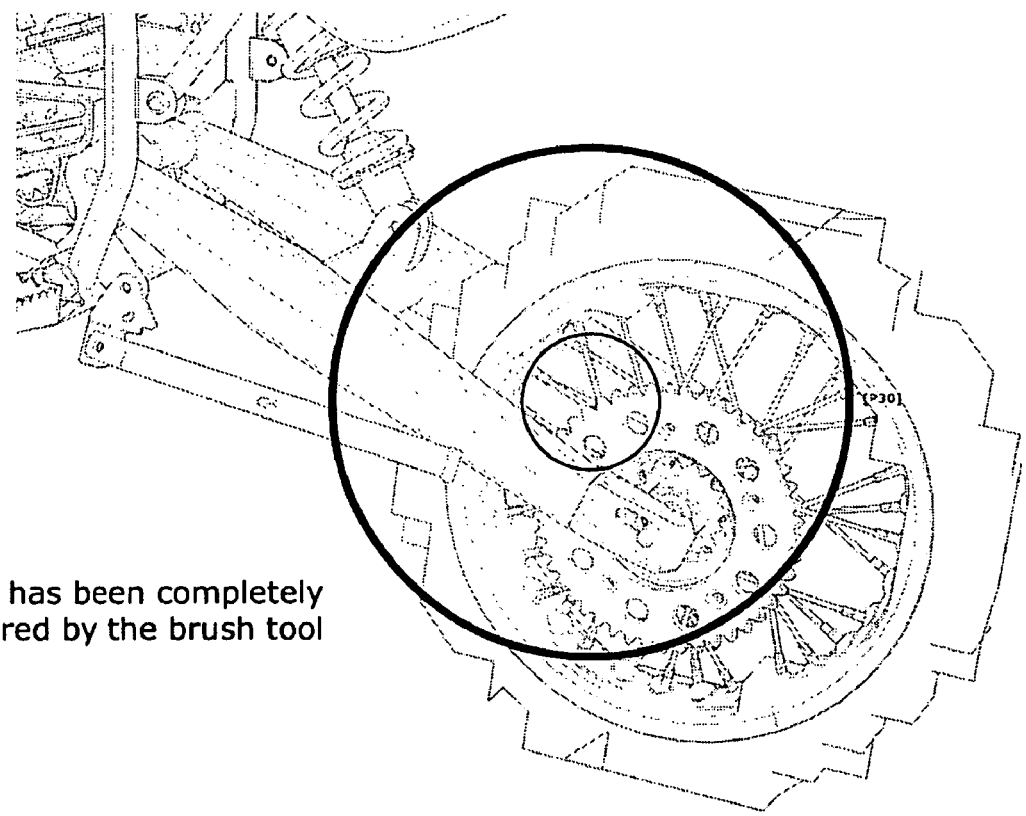
FIG. 14 is another screen shot of the implementation of local degradation of a 3D image.

In the following example, shown in computer screen shots of FIGS. 5-9, the decreasing accuracy of a seat of a 3D motorcycle is demonstrated. P is a parameter of the tool, which is the desired precision, from little alteration of the seat when P=2 mm (FIG. 5) to substantial distortion of the seat when P=50 mm (FIG. 9).

Turning now to a specific implementation of the method of the local degradation, shown in the screen shot images of FIGS. 10-14, a graphical user interface is composed of a brush B which is a 2D zone of the 2D view. The 2D zone is defined by the user. In this implementation, B is a circular zone with a radius R which can be changed. The brush B is centered on the mouse cursor. When the user moves the mouse, the brush is moved. Optionally, a user can use a selection S function to select of geometries of the image such as its parts, volumes, surfaces, etc. The present method includes an alteration function F and the ability to choose different parameters for function F. Function F changes the precision P of the 3D vertices of the tessellated geometry.

A user is presented with various options or actions to perform. These include selection S. In addition, the user can modify the size and form of the degrading brush, e.g. modify the of brush radius. Further, the user can choose to alter Function F with its parameters (e.g. the precision P).

During use, the user moves the brush over the 3D model. Degradation is only performed when the user depresses the mouse left button. The user can change the 3D point of view during the process, such as to pan, rotate, and zoom. Only S elements under the brush are affected by the degradation. If S is empty, only objects under mouse cursor C are affected.

The degraded part can be identified on the computer screen to highlight the portion or part degraded from the portion(s) and parts not degraded. The level of degradation can be indicated by audibly. For example, as a user moves the cursor, a sound is made when the cursor is over a degraded part and no sound is generated when the cursor is over a non-degraded part. The pitch and the volume of the sound can reflect the amount of degradation.

In addition, the degradation can be indicated visual by altering the color or visual texture of the degraded part, on the computer screen to thereby enhance the perception that the portion has been degraded.

The following exemplar implementation of software code is intended to provide a further understanding of the present invention but in no way to limit the scope of the present invention.

F Possible Inputs:
  1. 3D Vertices of S
  2. 3D Normals of S
  3. Topology of S: points, edges, curves, surfaces, volumes,
  4. R (brush radius)

F Outputs:
  1. Modified 3D Vertices of S
  2. Modified 3D Normals of S
  3. Modified Topology of S: points, edges, curves, surfaces, volumes Pseudo-code of a Function F which Degrades 3D Vertices Precision:
  V is a vertex of S,
  Vero is the 2D projection of V in the 2D view,
  C is the 2D center of the brush (=the mouse cursor coordinates in the view),
  D=distance (Vero, C).

```
If D >= R, the vertex is ignored (not processed)
else
{
  Patt (Attenuated Precision) = P * D / R
  V coordinates are degraded in the following way :
      V.x = Degrade( V.x, Patt, P )
      V.y = Degrade( V.y, Patt, P )
      V.z = Degrade( V.z, Patt, P )
  with :
      float Degrade( float fValue, float fPAtt, float fP )
      {
      if(fValue > 0)
      {
          float fMainMin = (float) ((int) ( fValue / fP )) * fP;
          float fMainMax = fMainMin + fP;
          float fSub     = (float) ((int) ( fValue / fPAtt )) * fPAtt;
          if(fSub < fMainMin)
              return fMainMin;
          if(fSub > fMainMax)
              return fMainMax;
          return fSub;
      }
      float fMainMax = (float) ((int) ( fValue / fP )) * fP;
      float fMainMin = fMainMax - fP;
      float fSub     = (float) ((int) ( fValue / fPAtt )) * fPAtt;
      if(fSub < fMainMin)
          return fMainMin;
      if(fSub > fMainMax)
          return fMainMax;
      return fSub;
      }
}
```

The present degrading tool can be used to track changes made as a user degrades a part or assembly. The present degrading tool can synchronize a degraded assembly with its corresponding original assembly so that a subsequent user does not have to repeat the manual steps. To achieve this result, information about the degrading process is stored, but the degraded part is not. The stored information may include the environment; e.g. camera position, orientation, etc.; the parameters chosen for the degrading tool, the trajectory of the cursor and the parameters of the 3D viewpoint.

It will now be readily apparent to one of ordinary skill in the art that the present degradation method can be applied using automated tools to alter a 3D image which is visually perceivable by the human eye as a good representation of the original 3D image. For example, since the human eye is very good at finding symmetries and imbalances in symmetries, which can affect an outer shape or the concentricity of two cylindrical objects, design intents of the present degradation method related to symmetry or concentricity cannot be substantially eliminated; they can be somewhat skewed. Therefore, advantageously, only the size of the parts are changed by the degradation method.

It will now be apparent to one of ordinary skill in the art that the present degrading method offers features and advantages from prior methods of protecting the intellectual property of 3D images. The present method allows for the distribution of 3D images which are viewable in essentially their original form so that one can recognize and use the information of the 3D image as desired by the creator of the 3D image. Accordingly, it will be understood by one of ordinary skill in the art that the present degrading method is distinguishable from prior encryption methods in that the present degrading method allows one to view authorized portions of the 3D image in essentially their original form unlike encryption methods which completely alter the 3D image, and thereby prevent access and viewing of the image without de-encrypting the image file first.

It will now be readily apparent to one of ordinary skill in the art that the present degradation method can be applied using automated tools to alter a 3D image which is visually perceivable by the human eye as a good representation of the original 3D image. For example, since the human eye is very good at finding symmetries and imbalances in symmetries, which can affect an outer shape or the concentricity of two cylindrical objects, design intents of the present degradation method related to symmetry or concentricity cannot be substantially eliminated; they can be somewhat skewed. Therefore, advantageously, only the size of the parts are changed by the degradation method.

A further feature of the present degrading method is provided by altering portions of the 3D image file so that one cannot reverse engineer or manufacture the subject matter, i.e. part or parts of the image file due to the present degrading function which alters dimensions or the form of various portions of the original 3D image.

Although the invention has been described above in relation to preferred embodiments thereof, it will be understood by those skilled in the art that variations and modifications can be affected in these preferred embodiments without departing from the scope and spirit of the invention.

The invention claimed is:

1. A method of degrading three dimension image data, said method comprising:
   selecting a native data file including metadata and containing at least one three dimensional image of an assembly comprising at least two parts, said at least two parts comprising one or more constraint parameters selected from a group including a number of degrees of freedom and ranges;
   modifying one or more constraints of at least one of the at least two parts; and
   creating one or more levels of indirection in the metadata, to thereby form a degraded image file that is displayable in substantially original form.

2. The method of claim 1, further comprising creating relationships between the parts to form parent-child relationships, where the two parts previously were independent.

3. The method of claim 1, wherein said at least two parts form a parent-child relationship with one another, and said method further comprises modifying the parent-child relationship between said at least two parts.

4. The method of claim 1, further comprising selecting at least one of said at least two parts in the native data file which will not be present in the degraded image file.

5. The method of claim 1, further comprising selecting at least one of the at least two parts in the native data file which will not be altered from its native form present in the degraded image file.

6. The method of claim 1, wherein said native data file is a CAD file and said method further comprises converting the CAD file into a reduced representation of the three dimensional image of the CAD file, as a lightweight file.

7. The method of claim 1, wherein said native data file is a CAD file and said method further comprises selectively removing data from the CAD file.

8. The method of claim 1, wherein said constraint parameter consists of the number of degrees of freedom.

9. The method of claim 1, wherein the degraded image file can be restored to reproduce the original three dimensional image using a reverse degradation function.

10. A non-transitory computer readable medium having computer executable instructions stored therein for execution by a computer processor, the computer executable instructions for degrading three dimension image data for a three dimensional image of an assembly comprising at least two parts, said instructions for causing the computer processor to execute the steps of:
    modifying one or more constraint parameters of at least one of the at least two parts of the assembly, the constraint parameters selected from a group including a number of degrees of freedom and ranges; and
    creating one or more levels of indirection in metadata of the three dimension image data, to thereby form a degraded image file that is displayable in substantially original form.

11. The non-transitory computer readable medium of claim 10, wherein said computer executable instructions are further for causing the computer processor to execute the steps of:
    (i) modifying a parent-child relationship between the at least two parts, if the at least two parts have a parent-child relationship with one another; or
    (ii) creating one more relationships between the at least two parts to form a parent-child relationship, if the at least two parts previously were independent.

12. A system for degrading three dimension image data of a three dimensional image of an assembly comprising at least two parts, said system comprising:
    memory; and
    a processor, said processor for:
        modifying one or more constraint parameters of at least one of the at least two parts of the assembly, the constraint parameters selected from a group including a number of degrees of freedom and ranges; and
        creating one or more levels of indirection in metadata of the three dimensional image, to thereby form a degraded image file that is displayable in substantially original form.

* * * * *